United States Patent [19]

Dosako et al.

[11] Patent Number: 5,116,953

[45] Date of Patent: May 26, 1992

[54] METHOD FOR THERMALLY TREATING LACTOFERRIN

[75] Inventors: Shunichi Dosako, Urawa; Rika Shinooka, Tokorozawa; Maki Tanaka, Sayama, all of Japan

[73] Assignee: Snow Brand Milk Products Company, Limited, Hokkaido, Japan

[21] Appl. No.: 422,489

[22] Filed: Oct. 17, 1989

[30] Foreign Application Priority Data

Oct. 17, 1988 [JP] Japan .................. 63-259311
Oct. 17, 1988 [JP] Japan .................. 63-259312

[51] Int. Cl.$^5$ .................... C07K 3/00; C07K 15/22
[52] U.S. Cl. ..................... 530/400; 426/522
[58] Field of Search ............. 530/395, 400, 394; 426/520, 521, 522

[56] References Cited

U.S. PATENT DOCUMENTS 4,791,193 12/1988 Okonogi et al. .............. 530/416
5,008,120 4/1991 Tanaka et al. ............... 426/74

FOREIGN PATENT DOCUMENTS 63-051337 3/1988 Japan .
2132466 7/1984 United Kingdom .

OTHER PUBLICATIONS

Goldblum et al. 1984. J. Pediatr 104:380-385.
Morgan, J. N. 1985. Dissertation Abstracts International, 46(5):1401.
Goldsmith et al. 1983. J. of Food Protection. 46 (1):4-7.
Nakamura et al. 1979. Agric. Biol. Chem. 43(11):2393-2394.
Lyster et al. 1984. Human Milk Banking. (eds.) A. F. Williams and J. D. Baum. Vevey/Raven Press. N.Y. pp. 93-100.
A. Hekman, "Association of Lactoferrin With Other Proteins, As demonstrated by Changes in Electrophoretic Mobility." Biochimica et Biophysica Acta., 251 (1971), 380-387.
J. Grant, ed., Hackh's Chemical Dictionary, Third Edition, 1950, p. 191.
Varunsatian et al., "Effects of Ca++, Mg++, and Na++on Heat Aggregation of Whey Concentrates," Journal of Food Science, vol. 48, 1983, pp. 42-46, 107.
Harrington et al., "Unfolding of Iron and Copper Complexes of Human Lactoferrin and Transferrin," Int. J. Biochem., vol. 19, No. 10., 1987, pp. 1001-1008.

Primary Examiner—Robert A. Wax
Assistant Examiner—Keith C. Furman
Attorney, Agent, or Firm—Millen, White & Zelano

[57] ABSTRACT

An aqueous lactoferrin solution can be thermally treated for heat pasteurization or spray drying purposes substantially without impairing the iron-binding ability of the lactoferrin by first adjusting the ionic strength thereof in accordance with the formulae, wherein I is ionic strength and T is temperature (°C.):

$$\log I \leq -T/10 - 5 \quad (60 \leq T \leq 80° C.)$$

$$\log I \leq -3 \quad (T \geq 80° C.).$$

6 Claims, No Drawings

METHOD FOR THERMALLY TREATING LACTOFERRIN

BACKGROUND OF THE INVENTION

1. Field of the Invention

The present invention relates to a method for thermally treating lactoferrin without impairing its physiological function, the aforesaid lactoferrin being a pharmacodynamically important milk protein.

2. Description of the Prior Art

Lactoferrin is an iron-binding glycoprotein present in an external secretion of milk and the like, and it has various physiological activities such as bacteriostatic action to pathogenic germs, differentiation regulatory action for leukopenia, enhancement of microbicidal activity of neutrophils, proliferation action of lymphocytes, and iron-absorption regulation action. Therefore, the lactoferrin is the important milk protein not only from a nutritional viewpoint but also from a pharmacodynamical viewpoint.

These physiological functions of lactoferrin arise mainly from the iron-binding ability of the lactoferrin, which exerts its ability to chelate-bind iron only when the three-dimensional stereostructure of the lactoferrin is maintained.

However, when the three-dimensional stereostructure of the lactoferrin is destroyed by heating, the lactoferrin precipitates. In fact, even if the concentration of the lactoferrin is as low as about 0.5%, the lactoferrin precipitates merely by heating at 60° C. for 15 minutes. Therefore, only filtration is employed as a means for removing bacteria from an aqueous lactoferrin solution for the sake of sterilization.

When lactoferrin is utilized for the purpose of enriching iron in food and drink, pasteurizing the lactoferrin is essential. For example, the refreshing beverage manufacturing standards of the Japanese Food Sanitation Act require that (1) when the pH is 4.0 or less, heating at 65° C. for 10 minutes or pasteurization having an effect equal to or greater than this heating shall be performed, and (2) when the pH is 4.0 or more, heating at 85° C. for 30 minutes or pasteurization having an effect equal to or greater than this heating shall be performed. Consequently, lactoferrin which has undergone the filter bacteria removal by filtration cannot be used as an ingredient in refreshing beverages and the like.

Furthermore, when an attempt is made to produce the lactoferrin in powder form by heating and then spray-drying an aqueous lactoferrin solution, precipitates are formed, so that spray nozzles become clogged and the operation cannot be continued. In addition, the iron-binding ability which is the desired property of the lactoferrin is lost by the heating, and the physiological function is also undesirably impaired.

In this connection, although freeze-drying can be employed to prepare lactoferrin, such means increases a manufacturing cost. Thus, this means is not advantageous.

SUMMARY OF THE INVENTION

An object of the present invention is to provide a method for thermally treating an aqueous lactoferrin solution for the purposes of thermally pasteurizing and powdering the same by spray-drying without impairing the property of the lactoferrin itself, i.e., iron-binding ability which is the basis for its various physiological functions.

Other objects of the present invention will become apparent from the following description.

In accordance with the present invention, ionic strength (I) of the starting aqueous lactoferrin solution is first adjusted and the aqueous lactoferrin solution is then thermally treated in accordance with the following formula, where T is temperature (°C.)

$$\log I \leq -T/10 + 5 \quad (60 \leq T \leq 80^\circ \text{ C.})$$

$$\log I \leq -3 \quad (T \leq 80^\circ \text{ C.})$$

DETAILED DESCRIPTION OF THE INVENTION

The lactoferrin used in the present invention can have the structure in which iron is combined therewith or the other structure in which iron is released, so long as it has the ability to combine with iron when it is in an unmodified state.

Known techniques of separating and purifying lactoferrin are, for example, a method utilizing an ion exchange resin (Gordon et al., Biochim. Biophys. Acta, 60, pp. 410–411, 1962), a method using heparin affinity chromatography (Blockberg et al., FEBS Lett., 109, p. 180, 1980), a method using an anti-latoferrin monoclonal antibody immobilized column (Japanese Laid-open Patent Application No. 145200/1986), and a method using a carrier which has been subjected to a sulfuric ester treatment (Japanese Application No. 88450/1987). However, the starting lactoferrin may be prepared by any method, so long as it has the ability to combine with iron when it is in an undenatured state.

The lactoferrin used in a thermal treatment of the present invention may be in a solution state or may be what has been prepared by dissolving its powder form. In the thermal treatment for heat pasteurization, the concentration of the aqueous lactoferrin solution may be high. Even in the heating treatment employed for the formation of the powdery lactoferrin by spray drying, although the concentration of the aqueous lactoferrin solution is not limited particularly, usually after "it", it is preferred that the concentration of the lactoferrin be at a level of 10 to 20%. When the concentration of the aqueous lactoferrin solution is in excess of 20%, the viscosity of the aqueous solution increases excessively, so that spray operation is difficult; when it is lower than 10%, the powder obtained by the spray drying tends to be too fine.

The important point of the present invention is that the ionic strength I of the aqueous lactoferrin solution is adjusted so as to satisfy the specific conditions, i.e., the following formulae:

$$\log I \leq -T/10 + 5 \quad (60 \leq T \leq 80^\circ \text{ C.})$$

$$\log I \leq -3 \quad (T \leq 80^\circ \text{ C.})$$

wherein T is a temperature (° C.).

When T is less than 60° C., the lactoferrin is not denatured, and therefore it is not particularly necessary to adjust the ionic strength I. However, when T is more than 60° C., and when the ionic strength I deviates from the above-mentioned conditions represented by the formulae, the lactoferrin precipitates and its iron-binding ability declines Adjusting the ionic strength of the aqueous lactoferrin solution so as to meet the above-mentioned conditions can be achieved by dissolving the starting lactoferrin in deionized water.

In particular, when the aqueous lactoferrin solution having a high salt concentration is subjected to the heat treatment for sterilization purposes, it is necessary to adjust the ionic strength I of the aqueous solution by desalting so as to satisfy the above conditions represented by the formulae.

On the other hand, when the aqueous lactoferrin solution is thermally treated by spray drying, it is particularly necessary to adjust the ionic strength I of the aqueous solution to $10^{-3}$ or less. In this case, attention is paid to ensuring that the ionic strength of the aqueous lactoferrin solution does not exceed a level of $10^{-3}$ because if the ionic strength of the aqueous lactoferrin solution is in excess of $10^{-3}$, precipitates are formed during the spray drying at the time of the heating concentration, with the result that spray nozzles are clogged with the thus-formed precipitate.

Therefore, when an aqueous lactoferrin solution having a high salt concentration is subjected to the spray drying treatment, it should be confirmed that after the sufficient desalting, the ionic strength of the aqueous solution is $10^{-3}$ or less.

As conditions for the spray drying of the aqueous lactoferrin solution, usual spray drying conditions may be employed, for example, the inlet temperature is from 140° to 180° C. and the outlet temperature is from 80° to 95° C.

Table 1 shows the combined effect of the ionic strength of the aqueous lactoferrin solution and the heating temperature on the formation of precipitate.

In this case, the concentration of an aqueous lactoferrin solution sample was adjusted to 10%.

TABLE 1

[Influence of ionic strength of 10% aqueous lactoferrin solution and heating temperature on precipitation state]

| Heating Conditions | Ionic Strength | | | | |
|---|---|---|---|---|---|
|  | 0 | $10^{-4}$ | $10^{-3}$ | $10^{-2}$ | $10^{-1}$ |
| at 60° C. for 30 min. | — | — | — | — | ± |
| at 70° C. for 15 min | — | — | — | ± | + |
| at 80° C. for 10 min. | — | — | — | + | ++ |
| at 90° C. for 10 min | — | — | ± | + | +++ |

The symbols in the table have the following means:
—: No precipitate formed.
±: A slight amount of precipitate formed.
+: Precipitate formed.
++: Appreciable amount of precipitate formed.
+++: A noticeable amount of precipitate formed.

Table 2 shows the influence of the ionic strength of the aqueous lactoferrin solution and heating temperature on the iron-binding ability of the lactoferrin after the heating treatment. In this table, the values indicating the iron-binding ability are in percent.

In this case, the concentration of the starting aqueous lactoferrin solution sample was adjusted to 10%.

TABLE 2

[Influence of ionic strength of 10% aqueous lactoferrin solution and heating temp. on binding power (%)]

| Heating Conditions | Ionic Strength | | | | |
|---|---|---|---|---|---|
|  | 0 | $10^{-4}$ | $10^{-3}$ | $10^{-2}$ | $10^{-1}$ |
| at 60° C. for 30 min. | 100 | 100 | 100 | 94 | 100 |
| at 70° C. for 15 min. | 100 | 100 | 100 | 90 | 77 |
| at 80° C. for 10 min. | 97 | 97 | 94 | 60 | 13 |
| at 90° C. for 10 min. | 97 | 94 | 90 | 30 | 0 |

The values of the iron-binding ability (%) in Table 2 were calculated as follows:

First, 1 drop of a 5% aqueous sodium bicarbonate was added to 1 ml of a supernatant obtained by removing precipitates from the aqueous lactoferrin solution, and an absorbance $OD_o$ at 465 nm was then measured. Afterward, 100 μl of a 2% $FeCl_3 \cdot 6H_2O$ solution was added thereto, and an absorbance $OD_f$ at 465 nm was then measured. In like manner, measurement was made for the aqueous solution of the unheated lactoferrin to obtain absorbances $\overline{OD}_o$ and $\overline{OD}_f$. The iron-binding ability was calculated on the basis of the measured values in accordance with the following formula:

$$\text{Iron-binding ability} = [(OD_f - OD_o)/OD_o]/[(\overline{OD}_f - \overline{OD}_o)/\overline{OD}_o] \times 100$$
(%)

According to the method of the present invention, the starting lactoferrin can be thermally treated for heat pasteurization and spray drying purposes without forming any precipitate and without the thermally treated lactoferrin losing its iron-binding ability.

Therefore, the present invention permits the thermal pasteurization of a aqueous lactoferrin solution in a manner which renders it utilizable as an ingredient in food and beverage without impairing the physiological functions of the lactoferrin. Therefore the thus treated aqueous solution can be utilized conveniently in the preparation of the food and beverage.

For example, an iron-enriched beverage can be prepared by the following procedure: Lactoferrin, an iron agent and sodium bicarbonate are dissloved in water to form an aqueous solution or, alternatively, iron-saturated lactoferrin obtained by chelate-binding ferric ions to the lactoferrin is dissolved in water to form an aqueous solution. Afterward, the ionic strength of the aqueous solution is adjusted to a selected level in accordance with this invention, and the aqueous solution is then thermally pasteurized. Separately, the raw material solution for a beverage is pasteurized by heating and then cooled. Both of the thus prepared solutions are then mixed, and containers are filled with the resulting liquid mixture, whereby a sterile iron-enriched beverage can be prepared.

Furthermore, the lactoferrin powder obtained by subjecting the aqueous lactoferrin solution to a heating treatment and a spray drying treatment in accordance with the present invention can also retain the iron-binding ability of the lactoferrin itself satisfactorily, and it also has various physiological functions derived from this iron-binding ability. Accordingly, the lactroferrin powder can be widely utilized in food materials.

The present invention will be described in detail in reference to the following.

EXAMPLE 1

In 1 liter of deionized water was dissolved 100 g of a freeze-dried bovine lactoferrin powder. This aqueous lactoferrin solution was placed in a vessel with a lid, and it was then pasteurized by heating in a hot water at 85° C. for 30 minutes. After the heating, the aqueous lactoferrin solution was immediately cooled to room temperature with running water. At this time, the formation of precipitates were not observed at all. When measured after cooling, the iron-binding ability of the bovine lactoferrin was 97%.

EXAMPLE 2

Ten tons of raw skim milk was caused to flow through a carrier comprising chitosan beads to which sulfuric ester was groups were attached, and bovine lactoferrin which was absorbed thereon was then eluted with a 1M saline solution. The eluate was desalted/concentrated through an ultrafilter (DDS 20), so that 20 liters of a lactoferrin solution was obtained which had a protein concentration of 5.0%. When calculated for a sodium ion concentration by an atomic absorption spectrometer, the ionic strength of this solution was $4 \times 10^{-4}$.

The thus-produced solution was then pasteurized by heating at a temperature of 95° C. for 4 seconds using a plate type heat-exchanger and then cooled to 7° C. No precipitate was observed, and the iron-binding ability of the thermally pasteurized lactoferrin was 98%.

EXAMPLE 3

In 180 milliliters of deionized water was dissolved 20 g of a freeze-dried bovine lactoferrin powder. This aqueous lactoferrin solution was dried at an inlet temperature of 140° C. and at an outlet temperature of 85° C. using a small-sized spray dryer (YAMATO PULVIS Basic Unit Model GB-21) to obtain about 12 g of a dried powder. This powder was then dissolved in an amount of water to provide a concentration of 1%. The powder completely dissolved therein.

The iron-binding ability of the thus-obtained lactoferrin powder, then was measured by the following procedure:

The thus obtained powder and the starting freeze-dried powder which had undergone no spray drying treatment were each dissolved in water to a concentration of 1% by weight, and 1 drop of a 5% sodium bicarbonate was added thereto. Afterward, absorbance at 465 nm of each solution was measured. Their respective absorbances were designated $A_{so}$ and $A_{fo}$.

Next, 50 μl of $FeCl_3 \cdot 6H_2O$ at a concentration of 7 mg/ml were added to 5 ml of the lactroferrin solution, and absorbance at 465 nm of each solution was measured again. Their respective absorbances were designated $A_{sf}$ and $A_{ff}$.

Iron-binding ability was calculated in accordance with the formula:

$$[(A_{sf} - A_{so})/A_{so}]/[(A_{ff} - A_{fo})/A_{fo}] \times 100 \, (\%)$$

The iron-binding ability of the spray-dried powder obtained in this example was 91%.

EXAMPLE 4

Ten tons of raw skim milk was caused to flow through a carrier comprising chitosan beads to which sulfuric ester groups were attached, and bovine lactoferrin which was absorbed thereon was then eluted with a 1M saline solution. The eluate was desalted/concentrated through an ultrafilter (DDS 20), so that 20 liters of a lactoferrin solution was obtained which had a protein concentration of 5.0%. When calculated for a sodium ion concentration by an atomic absorption spectrometer, the ionic strength of this solution was $4 \times 10^{-4}$.

Afterward, this solution was concentrated to 8 liters by a vacuum evaporator and then subjected to a spray drying treatment. In this case, an inlet temperature was 150° C., and an outlet temperature thereof was 87° C. The amount of the recovered bovine lactoferrin was 780 g.

When measured in the same manner as in Example 3, the iron-binding ability of the obtained lactoferrin was 94%.

What is claimed is:

1. A method for thermally treating an aqueous solution of isolated lactoferrin having iron-binding activity which comprises the steps of adjusting the ionic strength I of said aqueous lactoferrin solution then heating said aqueous lactoferrin solution, in accordance with the following formulae:

$$\log I \leq -T/10 + 5 \quad (60 \leq T \leq 80°)$$

$$\log I \leq -3 \quad T \geq 80° \, C.$$

wherein I is ionic strength and
T is temperature (°C.) and thereafter spray-drying said aqueous lactoferrin solution.

2. A method for thermally treating an aqueous lactoferrin solution according to claim 1 wherein the ionic strength of said aqueous lactoferrin solution is adjusted to $10^{-3}$ or less.

3. A method for thermally treating an aqueous lactoferrin solution according to claim 1 wherein the concentration of said aqueous lactoferrin solution is from 10% to 20%.

4. A method for thermally treating an aqueous lactoferrin solution according to claim 2, wherein the concentration of said aqueous lactoferrin solution is from 10% to 20%.

5. A method according to claim 2, wherein $T \geq 80°$ C.

6. A method according to claim 5, wherein the starting spray-drying temperature is from 140°–180° C., and the ending temperature is from 80°–95° C.

* * * * *